May 23, 1967
S. D. ROSS
3,321,676
ENCLOSED ELECTROLYTIC CAPACITOR WITH INSULATIVE IMPERVIOUS
SEAL-LAYER ON SECTION-BODY
Filed June 4, 1964
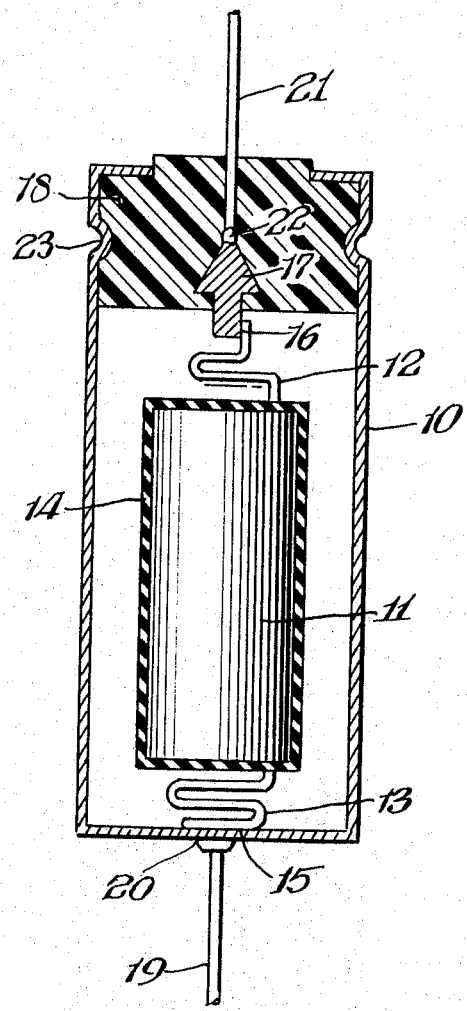
INVENTOR
*Sidney D. Ross*
BY *Connolly and Hutz*
ATTORNEYS

3,321,676
ENCLOSED ELECTROLYTIC CAPACITOR WITH INSULATIVE IMPERVIOUS SEAL-LAYER ON SECTION-BODY
Sidney D. Ross, Williamstown, Mass., assignor to Sprague Electric Company, North Adams, Mass., a corporation of Massachusetts
Filed June 4, 1964, Ser. No. 372,566
6 Claims. (Cl. 317—230)

ABSTRACT OF THE DISCLOSURE

An aluminum electrolytic capacitor having an electrolyte-impregnated capacitance section, said section being completely enveloped by a section-conforming, substantially neutral, water-insoluble, electrolyte impervious, continuous organic dielectric, formed-in-place film.

---

The present invention is concerned with aluminum electrolytic capacitors and more particularly with such capacitors which are normally subject to internal corrosion.

The common corrosive agents: chlorides, sulfates, ammonia, etc., are abundant in our environment, and readily find their way into aluminum electrolytic capacitors. It is highly probable that all aluminum units contain some contaminants, yet not all capacitors fail because of corrosion. There are two possible explanations for the corrosion-caused failures. One is that all units contain a level of contamination close to the permissible margin of safety and some single part or manufacturing operation sporadically introduces an untoward amount of contamination which eventually results in corrosion. The other possibility is that the normal level of contaminants is harmless when homogeneously distributed throughout the capacitor, but causes corrosion when concentrated in some sensitive spot.

A mechanism which aids the concentration of contaminants at the known points of failure, is the absorption of water. An electrolyte such as glycol and a borate is quite hygroscropic. In a capacitance section impregnated with such an electrolyte the section is exposed to the atmosphere for some considerable length of time; water is absorbed first on the exterior of the section and the tabs or leads and will then diffuse slowly toward the center.

Since diffusion is a relatively slow process, the outside of the section will always be richer in water than the center of the section. There will, in fact, be a sharp gradient in water concentration, with a maximum concentration on the exterior and a minimum concentration in the center. The metal foil is a barrier to penetration through the section in the direction perpendicular to the winding, and water will enter the interior only through the top and bottom where both the electrolyte and paper may act as wicks. The inhomogeneous distribution of water in the capacitance section tends to produce low resistance paths which concentrate the corrosive impurities at the internal leads or tabs and also at the points of contact of these members on the capacitor can cover.

It is the principal object of the present invention to present an electrolytic aluminum capacitor not subject to corrosion-caused failure.

Other objects and advantages of the present invention will be made obvious to those skilled in the art by the following description when considered in relation to the accompanying drawing of which:

The sole figure is a side view in section of the capacitor of the present invention.

The principal object of the present invention is achieved by providing the capacitance section of an aluminum electrolytic capacitor with a section-conforming, substantially neutral, water-insoluble, electrolyte-impervious, thin organic dielectric film completely enveloping said section.

In the drawing, the capacitor depicted therein has a metal housing in the form of a can 10 in which is contained a capacitance section 11 of a convolutely wound assembly of aluminum foil and spacer elements. The section is impregnated with a liquid electrolyte, which is not shown. Aluminum tabs or leads 12 and 13 have an end affixed to their respective aluminum foil electrodes. A section-conforming, substantially neutral, water-insoluble, electrolyte-impervious, thin organic dielectric film 14 completely envelopes section 11. The other end of tab 13 is spot-welded or otherwise affixed at 15 to the inside surface of can 10. In a similar manner, the other end of tab 12 is spot-welded as at 16 to a metal plug 17, which plug is partially embedded within elastomer bushing 18. An external lead-wire 19, for the can, is welded in place at 20. The second external lead-wire 21 is welded to metal plug 17 at 22.

To provide a seal between elastomer bushing 18 and can 10, adjacent to the open end thereof, an inward beading 23 is provided. During the inward beading operation, the edge of can 10 is rolled over against the top of bushing 18.

A preferred, specific embodiment of the above-described capacitor involves the use of ethylcellulose as the section-conforming, substantially neutral, water-insoluble, electrolyte-impervious, thin organic dielectric film completely enveloping the capacitance section. This material can be applied to the capacitance section via a 10%–20% solution of ethylcellulose having an ethoxy content of 48.5%–49.5% dissolved in a solvent mixture of toluene 40:ethyl acetate 40:ethanol 20. The ethylcellulose film which is formed on the evaporation of the solvent, isolates the electrolyte and prevents impurities and contaminants from concentrating on the tabs or weld spots.

In general, the film, which completely envelops the capacitance section with a section-conforming layer, is a member selected from the group consisting of a hydrocarbon and a cellulose, which member is also substantially neutral, water-insoluble, electrolyte-impervious and a dielectric. Examples of such films are: waxes; petroleum jelly; polyolefins, e.g. polyethylene; and ethylcellulose and carboxymethylcellulose.

These film-forming materials can be applied by any of the methods familiar to the art, e.g. as a hot melt; as a spray, dip or swab-applied solvent solution of the material; etc. The film thickness need only be sufficient to insure film continuity and thereby effectively confine the electrolyte within the capacitance section. Usually a thickness of from about 1–20 mils will suffice.

The electrolyte employed in the subject capacitor can be any of the prior art electrolytes taught as being effective in an aluminum foil capacitor, e.g. water-glycol-borate, etc.

As is evident from the foregoing, the invention is not to be limited to formation of the rather specific illustrative device. Modifications and variations, as well as the substitutions of equivalents may be made without departing from the spirit of the invention as defined in the appended claims.

What is claimed is:

1. An aluminum electrolytic capacitor comprising an electrolytic capacitance section of convolutely wound aluminum foils separated by a spacer material, leads affixed to said foil and extending from said section; said section being impregnated with a liquid electrolyte; a section-conforming, substantially neutral, water-insoluble, electrolyte-impervious, continuous thin organic dielectric, formed-in-place film enveloping said section, said film being a member selected from the group consisting of a hydrocarbon and a cellulose; said leads protruding through said films; and an outer protective container housing said section and said film.

2. The capacitor of claim 1 wherein enveloping film is ethylcellulose.

3. The capacitor of claim 1 wherein the enveloping film is carboxymethylcellulose.

4. The capacitor of claim 1 wherein the enveloping film is a wax.

5. The capacitor of claim 1 wherein the enveloping film is petroleum jelly.

6. The capacitor of claim 1 wherein the enveloping film is polyethylene.

References Cited by the Examiner

UNITED STATES PATENTS

| | | | |
|---|---|---|---|
| 2,057,094 | 10/1936 | Georgiev | 317—230 |
| 2,160,646 | 5/1939 | Coutlee | 317—230 |
| 2,944,196 | 7/1960 | Peck | 317—230 |
| 3,058,040 | 10/1962 | Wellington | 317—230 |

JAMES D. KALLAM, *Primary Examiner.*